United States Patent [19]
Johnson

[11] Patent Number: 5,709,329
[45] Date of Patent: Jan. 20, 1998

[54] EXTENDED CAB PICKUP STORAGE TRAY

[76] Inventor: Gordon Emery Johnson, P.O. Box 778, Cando, N. Dak. 58324

[21] Appl. No.: 548,093

[22] Filed: Oct. 25, 1995

[51] Int. Cl.$^6$ .............. B60R 7/00; A47B 37/00
[52] U.S. Cl. .......... 224/402; 224/275; 224/542; 224/550; 224/564; 224/566; 296/37.5; 296/37.6; 296/37.8; 296/37.16; 108/44; 108/137
[58] Field of Search .............. 224/402, 550, 224/564, 565, 566, 539, 542, 275; 296/37.8, 37.16, 37.5, 37.6; 108/44, 46, 137, 143

[56] References Cited

U.S. PATENT DOCUMENTS

| | | | |
|---|---|---|---|
| 2,067,661 | 1/1937 | Ferrelle | 108/46 |
| 2,601,177 | 6/1952 | Smullen | 224/540 |
| 2,934,374 | 4/1960 | Mortenson et al. | 296/37 |
| 3,063,064 | 11/1962 | Mace | 108/44 |
| 3,110,429 | 11/1963 | Philips | 224/542 |
| 3,291,520 | 12/1966 | Smith | 296/37.16 |
| 3,446,526 | 5/1969 | Peters | 296/37 |
| 4,073,534 | 2/1978 | Hira | 296/37.16 |
| 4,155,312 | 5/1979 | Thorkildson | 108/137 |
| 4,260,091 | 4/1981 | French et al. | 224/311 |
| 4,351,555 | 9/1982 | Hashimoto | 296/37.16 |
| 4,357,046 | 11/1982 | Lalanne | 296/37.16 |
| 4,443,034 | 4/1984 | Beggs | 296/65 |
| 4,479,675 | 10/1984 | Zankl | 296/37.16 |
| 4,648,648 | 3/1987 | Shigesada et al. | 296/37.16 |
| 4,717,193 | 1/1988 | Noriega | 296/37.7 |
| 4,811,875 | 3/1989 | Disimone | 224/551 |
| 5,083,828 | 1/1992 | Accettura | 296/37.6 |

*Primary Examiner*—Linda J. Sholl
*Attorney, Agent, or Firm*—Curtis V. Harr

[57] ABSTRACT

A storage shelf for use in an extended cab type pickup is disclosed. The shelf consists of a folding tray having extendable outer edges for adjustment to fit most models of extended cab pickups. The shelf is laterally secured at either end to the interior molding of the pickup by the use of notches which fit into the contours of the molding. The surface of this shelf is surrounded by rails which extend around the outside of the tray. The effect of this is to provide an easily accessible place to store personal items. In addition, the lateral strength of the present invention is enhanced by the use of hinge braces, a rear side support block which helps support the rear edge of the shelf, and a support leg which extends from the front edge of the shelf to the floor of the pickup. These features allow for the storage of heavy objects on the present invention.

10 Claims, 4 Drawing Sheets

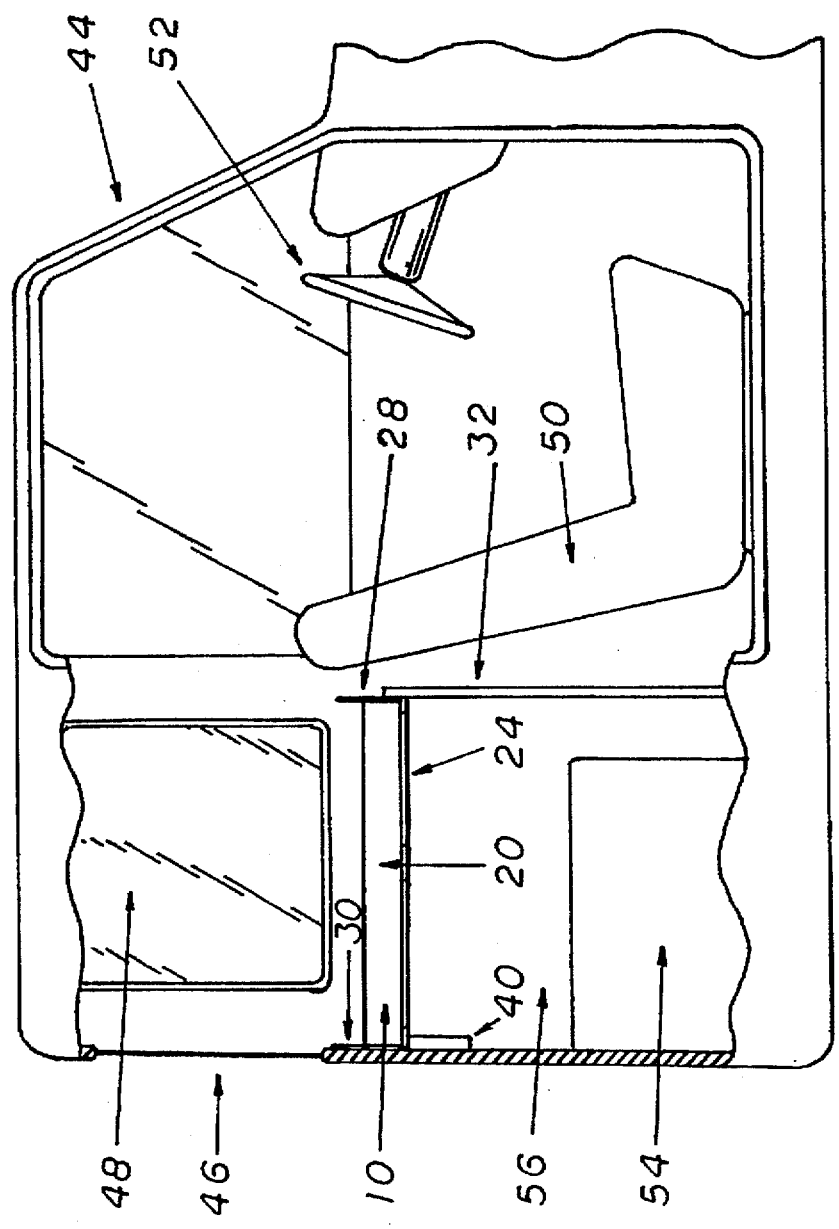

EXTENDED CAB PICKUP STORAGE TRAY

BACKGROUND OF THE INVENTION

The present invention relates to an improvement in a method of providing personal storage space for belongings in an extended cab pickup truck. More specifically, for the provision of an easily accessible space for the storing of personal belongings such as brief cases while leaving the seating area of the pickup free. Additionally, for the provision of an extra trunk like storage area beneath the present invention where one can store valuables out of view.

The popularity of pickup trucks for personal transportation has increased dramatically in the recent years. One of the biggest problems with the use of pickups for personal transportation is the lack of interior storage. In the past the only place to store personal belongings was either on the front seat or in the very limited area behind the seat. This has created a number of problems including the use of seating area for storage, the destruction of objects in the cramped and often dirty area behind the seat. It has also increased the necessity of having to leave valuable items in plain view, thereby making the pickup vulnerable to theft.

These problems have been partially alleviated by the growing popularity of extended cab pickups. This type of pickup has an extended area behind the seat and is often equipped with a small auxiliary seat. While this type of pickup does provide a greater degree of storage, it suffers from the problems of accessability of items stored there and the lack of a storage area that can keep valuables out of plain site.

Therefore, it can be seen that it would be highly desirable to provide a means of adding an easily accessible storage area behind the seat of an extended cab pickup truck. It can also be seen that it would be desirable if the same storage area would create an additional storage area, in which valuables could be stored out of site and thereby decrease the possibility of theft.

The present invention addresses the first of these problems by providing a tray like surface located just behind and below the back of the pickup's seat. This serves to cover the area behind the seat and thus, provides a trunk-like storage area in which valuables can be stored out of site.

SUMMARY OF THE INVENTION

It is the primary objective of the present invention to provide a useable and accessible storage area to be located directly behind the seat of an extended cab pickup truck.

Additionally, it is the objective of the present invention to provide an out-of-site, trunk-like area for the storage of valuables in the passenger area of an extended cab pickup truck.

These objectives are accomplished by the use of a tray-like shelf which mounts securely behind the seat of the extended cab pickup truck. The shelf is laterally secured at either end to the interior molding of the pickup by the use of notches which fit into the contours of the molding. The surface of this shelf is surrounded by rails which extend around the outsides of the trays. The effect of this is to provide an easily accessible place to store personal items.

In addition, the lateral strength of the present invention is enhanced by the use of hinge braces, a rear side support block which helps support the rear edge of the shelf, and a support leg which extends from the front edge of the shelf to the floor of the pickup. These features allow for the storage of heavy objects on the present invention.

The installation of the present invention in an extended cab pickup creates an area below and behind the seat of trunk-like storage, thus allowing the user to store valuables in a manner so that they can not be seen by people outside of the pickup. Thus, reducing the danger of break in and theft of the operator's personal belongings.

The above described features and advantages of novelty are pointed out with particularity in the claims of the present invention, reference should be made to the drawings in which there is illustrated and described preferred embodiments of the present invention.

DESCRIPTION OF THE DRAWINGS

FIG. 6 is a side elevation cut away view of a typical extended cab pickup truck showing the orientation of the present invention within the pickup truck.

DESCRIPTION OF THE PREFERRED EMBODIMENT

Figure 1:
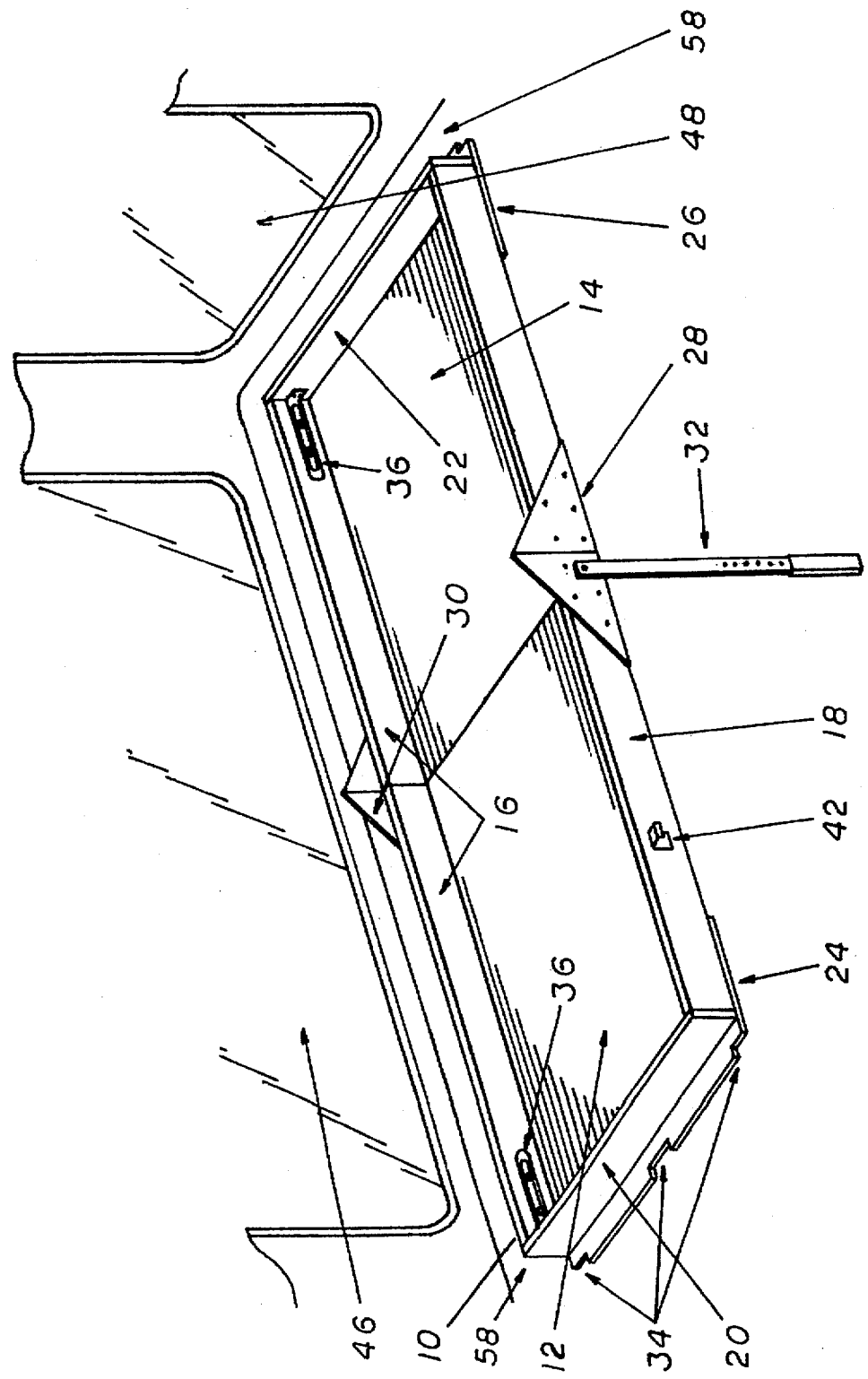
FIG. 1 is a perspective view of the Extended Cab Pickup Storage Tray showing the orientation of its major components and its positioning in the extended cab area of a typical late model pickup truck.

Referring now to the drawings, and more specifically to FIG. 1, the Extended Cab Pickup Storage Tray 10 is mounted in an extended cab pickup truck in a position just below the rear window 46 and the side window 48 of the pickup along the interior molding 58. The molding fitting notches 34, located on the most outward end of the left and right side extendable tray floors 24 and 26, fit in and lock into the existing contours of the interior molding 58 thereby eliminating any lateral movement of the present invention after installation.

The basic construction of the Extended Cab Pickup Storage Tray comprises a left and right side tray floors 12 and 14 which serves both as a platform for storage of miscellaneous items and as a cover for the storage area created beneath the present invention after installation. The left and right side floor trays 12 and 14 are surrounded by the rear side rail 16, front side rail 18, extendable left end rail 20, and the extendable right end rail 22. This configuration provides the tray design of the present invention and thus, keeps any stored objects from falling off of the left and right tray floors 12 and 14.

The extendable left end rail 20 and the extendable right end rail 22 are attached to the rear side rail 16 and the front side rail 18, by means of the extendable end rail slides 36. This configuration allows the extendable left and right end rails 20 and 22 to be adjusted and fixed outward in relation to the length of the present invention as needed by the varying dimensions of the interiors of extended cab pickup trucks of different manufacture. The additional floor space of the storage tray 10 that is necessary when in the extended position is provided by the left side extendable tray floor 24 and the right side extendable tray floor. These features are permanently fixed to the extendable left end rail 20 and the extendable right end rail 22 respectively. When the end rails are moved out to accommodate a wider pickup truck interior, the left and right side extendable tray floors 24 and 26 move with them and cover the gap left between the extendable left and right side end rails 20 and 22, and the left and right side tray floors 12 and 14.

Figure 2:
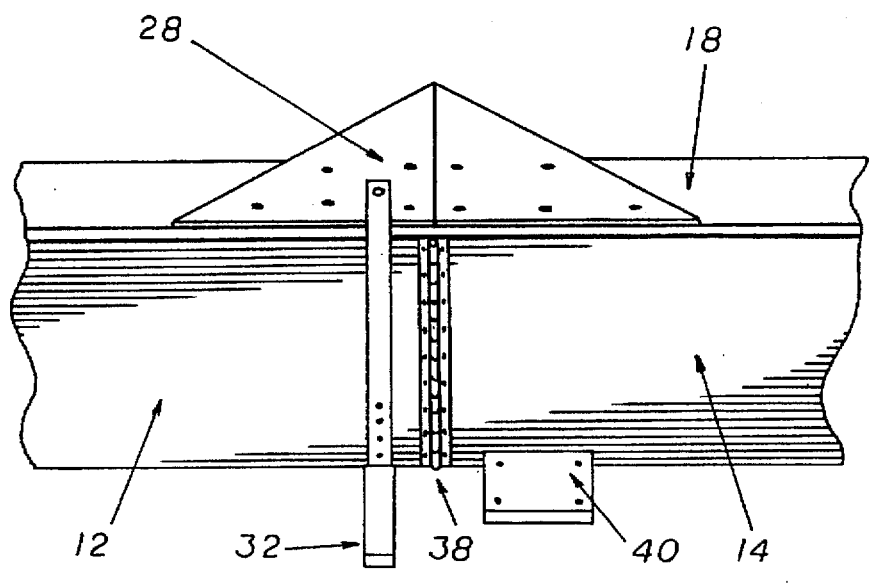
FIG. 2 is a perspective, close-up view of the present invention showing the orientation of its major support components and the manner in which they operate.
Figure 3:
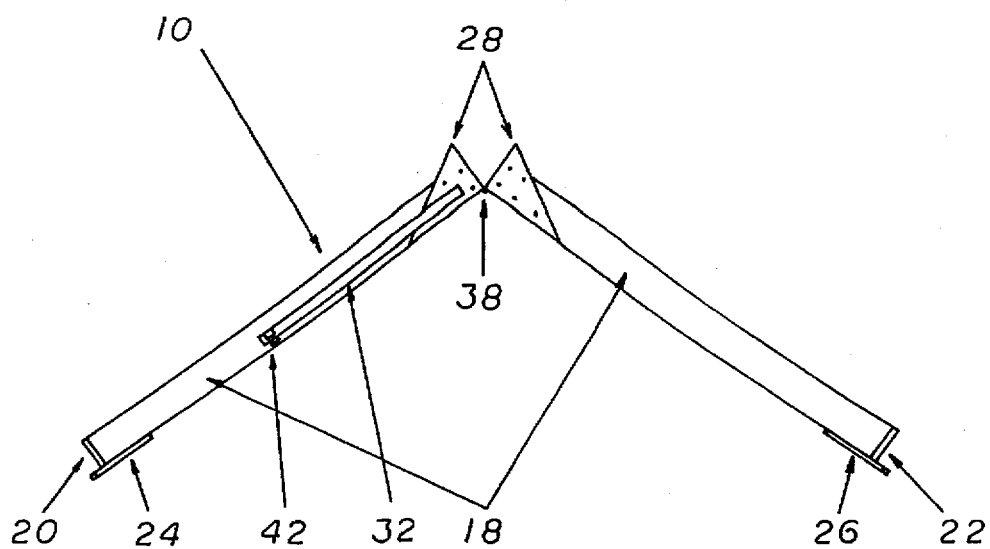
FIG. 3 is a front elevation view of the present invention showing the manner in which they can be folded, for easy storage, when not in use.

The Extended Cab Pickup Storage Tray 10 is also equipped with a number of components that increase its structural integrity as shown by FIGS. 1, 2, and 3. The front hinge brace 28 and the rear hinge brace 30 are constructed of heavy duty material such as steel or aluminum and are attached to the respective sides of the rear and front side rails 16 and 18 on either side of the piano hinge 38 which is in turn attached to the bottom sides of the left and right side tray floors 12 and 14. The purpose of these braces is to assist in lateral support at the piano hinge 38 when the present invention is installed and has objects stored upon it. This is accomplished by the tight fit of the components of the front and rear hinge braces 28 and 30 against each other, thereby resisting any downward movement, when the present invention is in the its flat, installed position. It is to be understood that the shape of these braces may be varied for aesthetic reasons, for example, they may be supplied with a flattened top or even be rectangular.

Also with the objective of increasing lateral integrity, the present invention is equipped with an adjustable length support leg 32. This feature is pivotally mounted at its upper most end to the front hinge brace 28 and can be extended downward to the floor of the pickup, thus adding lateral support. The adjustable length support leg 32 can also moved pivotally when not in use and attached to the support leg hook 42 which is in turn mounted to the front side rail 18. The final component of the present invention which adds to its lateral support is the rear support block 40 which is attached to the rear interior wall of the pickup cab and provides a resting point for the rear edge of the present invention.

Figure 4:
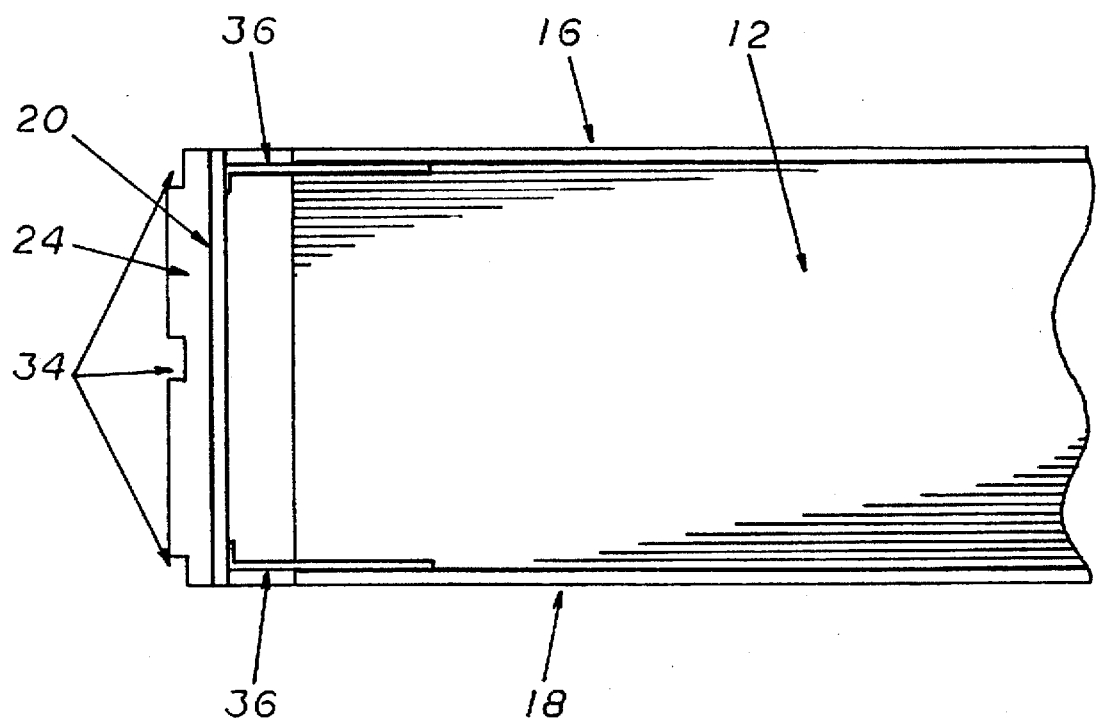
FIG. 4 is top elevation view of the present invention showing the manner in which the ends can be adjusted to accommodate the varying widths of extended cab pickups, as made by various manufacturers.
Figure 5:
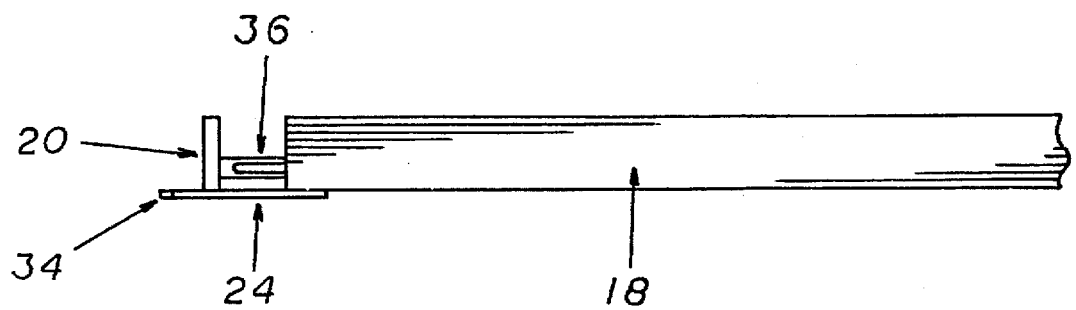
FIG. 5 is a side elevation view of the present invention showing how the overall length can be adjusted.

FIGS. 4 and 5 show the present invention with the extendable left side end rail 20 in its extended position. The extendable left end side rail 20 is attached to the rear and front side rails 16 and 18 by means of the extendable end rail slides 36. In this position there is a gap created between the extendable left end rail 20 and the left side floor tray 12. This gap is filled by the use of the left side extendable floor tray 24 which is permanently attached to the extendable left end rail 20 and extends the necessary length beneath the left side floor tray 12. In this manner, when the present invention is fitted to a pickup with a wider interior it can be adjusted to fit and maintain the tray floor throughout. Any reference to the left side of the present invention in the above discussion is purely for illustrative purposes and it should be noted that the functions described apply equally to the right side as well as the left.

FIG. 6 shows the positioning of the Extended Cab Pickup Storage Tray 10 within the cab 44 of the pickup and its orientation to the front seat 50 and the steering wheel 52 of the extended cab pickup truck. The present invention is located directly behind the front seat 50 and beneath the rear and side windows 46 and 48. This configuration creates an additional, trunk like storage area 56 in the area behind the seat 50 in the area of the existing rear seat 54. This figure again shows the positioning of the lateral support components such as the rear support block 40, the adjustable length support leg 32, and the front and rear hinge braces 28 and 30 with respect to the present invention (and more specifically the extendable left end rail 20 and the left side extendable tray floor 24), and to the interior of the pickup cab 44.

Although the present invention has been described in considerable detail with reference to certain preferred versions thereof, other versions are possible. For example the hinge braces may be of different shapes. Therefore, the spirit and scope of the appended claims should not be limited to the description of the preferred versions contained herein.

What is claimed is:

1. A storage tray for use in the rear seat area of an extended cab pickup comprising:

a rectangular shelf having a left and right end said shelf further having side rails about a front edge, and a rear edge;

a left and right extendable tray floor fixedly attached to an upwardly extending left and right side rail said tray floors having a portion extending outward from said respective left and right side rail, said tray floors further being slidably connected to said rectangular shelf at said left and right end with a pair of extendable slide means so as to allow said storage tray and said left and right side rails to be extended or retracted;

a means of supporting said shelf on said right and said left end; and a means of supporting said shelf on said rear edge.

2. A storage tray as in claim 1 wherein said tray further comprises:

a piano hinge running from the center of said rear edge to the center of said front edge said hinge allowing said shelf to fold in half;

a front hinge brace; and a rear hinge brace.

3. A storage tray as in claim 2 further comprising an extendable leg brace, said brace being pivotally attached to the front center of said shelf.

4. A storage tray as in claim 3 wherein said means of supporting said shelf on said right and said left end comprises molding fitting notches defined by said outward extending tray floor portion.

5. A storage tray as in claim 4 wherein said means of supporting said shelf on said rear edge is a fixably mountable support block.

6. A utility vehicle with storage tray comprising:

an extended cab type pickup;

a rectangular shelf having a left and right end said shelf further having side rails about a front edge, and a rear edge, said shelf being removably mounted in said pickup;

a left and right extendable tray floor fixedly attached to an upwardly extending left and right side rail said tray floors having a portion extending outward from said respective left and right side rail, said tray floors further being slidably connected to said rectangular shelf at said left and right end with a pair of extendable slide means so as to allow said storage tray and said left and right side rails to be extended or retracted;

a means of supporting said shelf on said right and said left end; and a means of supporting said shelf on said rear edge.

7. A utility vehicle with storage tray as in claim 6 wherein said tray further comprises:

a piano hinge running from the center of said rear edge to the center of said front edge said hinge allowing said shelf to fold in half;

a front hinge brace; and a rear hinge brace.

8. A utility vehicle with storage tray as in claim 7 further comprising an extendable leg brace, said brace being pivotally attached to the front center of said shelf.

9. A utility vehicle with storage tray as in claim 8 wherein said means of supporting said shelf on said right and said left end comprises molding fitting notches defined by said outward extending tray floor portion.

10. A utility vehicle with storage tray as in claim 9 wherein said means of supporting said shelf on said rear edge is a fixably mountable support block.

* * * * *